July 22, 1958     J. A. LOGUE ET AL     2,843,925
METHODS OF SEPARATING GLASS ARTICLES
Filed March 21, 1955
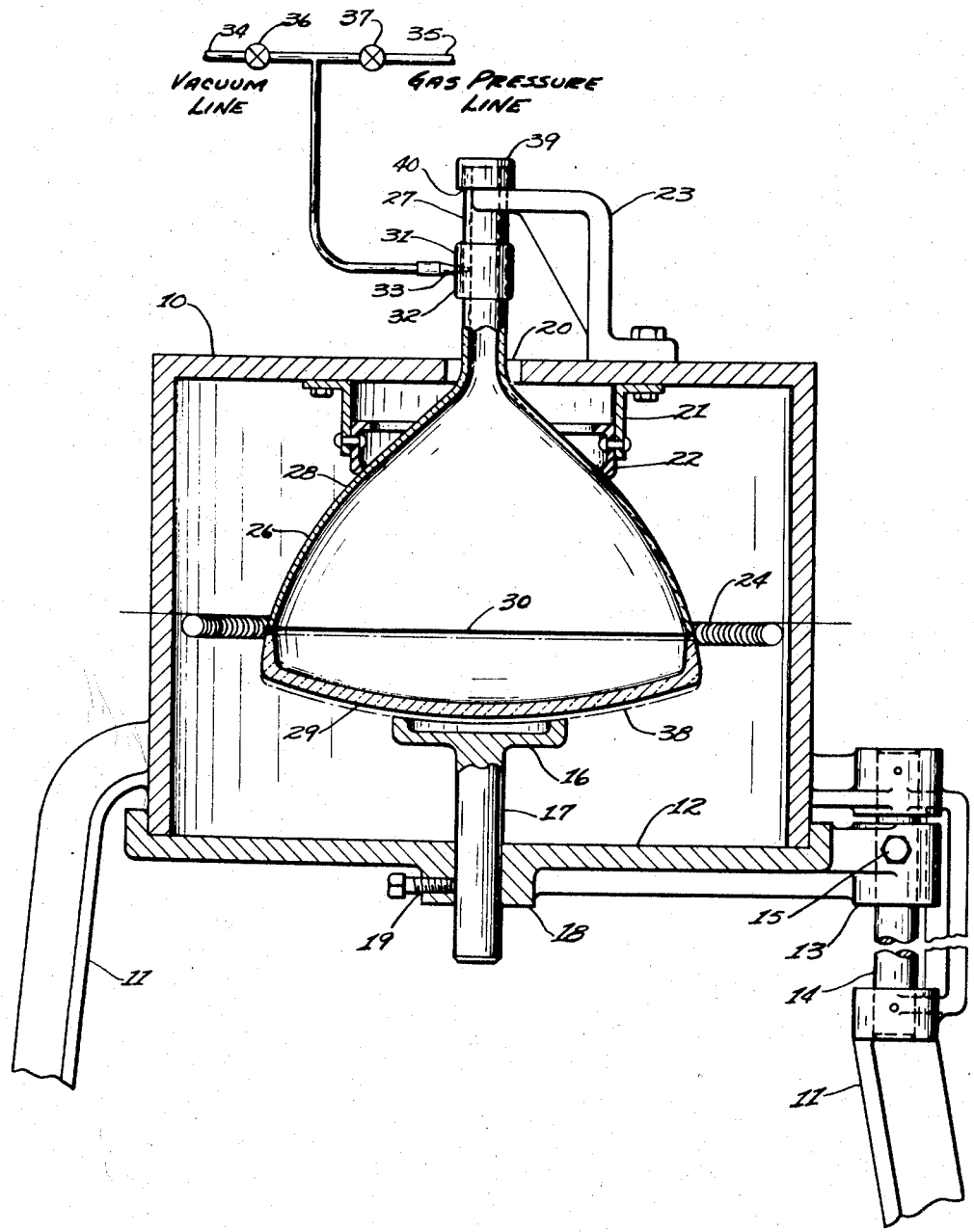
INVENTORS
JAMES A. LOGUE
THERON W. ROBERTS
BY FRANK O. SWANSON
ATTORNEYS United States Patent Office 2,843,925
Patented July 22, 1958

2,843,925

METHODS OF SEPARATING GLASS ARTICLES

James A. Logue, Theron W. Roberts, and Frank O. Swanson, Toledo, Ohio, assignors to Owens-Illinois Glass Company, a corporation of Ohio Application March 21, 1955, Serial No. 495,482

9 Claims. (Cl. 29—427)

The present invention relates to a method for the separation of manufactured glass articles and more particularly to the separation of hollow glass articles which have been assembled from prefabricated glass parts joined by sealing or welding compositions to form composite glass units.

The method disclosed herein is adaptable to the separation or disassembly of hollow glass articles which have been formed from a plurality of shaped glass parts joined or welded by vitreous seals, particularly by the low temperature glass sealing compositions described in co-pending patent application Low-Temperature Glass Sealing Composition, Serial No. 481,008, filed January 10, 1955, title to which application is commonly owned by the same assignee as the present application. The method is also applicable to the separation of glass-to-metal seals formed by low melting glass brazing compositions.

The separation of glass articles which have been constructed of individual hard glass parts joined by direct glass-to-glass fusing requires the use of high temperatures in the range of 1500° to 1950° F. to separate the parts. The use of high temperatures in the said range for assembly and disassembly of the glass parts creates conditions which are highly detrimental to the completed glass articles and their component parts, such as deformation or the generation of permanent stresses. The deformation can render the parts useless and the permanent stresses generally cause subsequent breakage of the glass units either spontaneously or from slight shock. In separating a direct glass-to-glass seal by the use of high temperatures, the division usually cannot be made without some distortion of the glass parts.

In certain cases high temperature assembly or disassembly may not be used because of the nature of the glass articles. For example, cathode ray tubes for color television reception cannot be subjected to high temperatures because of internal components easily damaged by exposure to high temperatures. Glass blocks having an internal color screen enclosed between the halves are another example of glass articles readily damaged by high temperatures.

In forming the joint between two or more glass parts by the use of low temperature sealing compositions, the deformation and permanent stresses usually produced in glass articles by high temperatures are avoided. Similarly, the same disadvantages must be avoided in the separation or disassembly of hollow glass articles. An improved method of opening assembled hollow glass articles is required to obtain greater accessibility to the internal space within the glass articles particularly when the glass shell encloses a complex array of working parts such as a cathode ray tube. It is also highly desirable to be able to separate the glass articles without damage to either the glass parts or the sensitive internal working parts.

At present in the manufacture of cathode ray tubes for color television reception an extreme degree of internal alignment between the multiple beam gun and the color grid is required within an individual tube. Also, the disposition of a large internal component, namely the shadow mask, in the front portion of the tube near the face plate requires that the tube funnel and face plate portions be fabricated separately and united after the said component is mounted internally. After the remainder of the internal working parts of the tube are properly disposed and aligned within the two major glass portions of the tube body, the glass parts are joined by a suitable hermetic seal.

Certain internal elements of a cathode ray tube for color television reception, namely the color grids and phosphors, are disposed within the tube near the junction of the funnel and face plate of the enclosing glass envelope. These specific elements are easily damaged or distorted by temperatures in excess of 824° F. (450° C.). For that reason the low temperature sealing compositions disclosed in patent application S. N. 481,008, furnish excellent bonding materials for adequately sealing the tubes without exceeding the temperature limits of the sensitive parts.

At present many tubes are rejected when rigidly inspected due to manufacturing defects such as faulty internal alignment and require reprocessing. The reprocessing of the tubes can only be accomplished at great expense due to extensive destruction of the external glass envelope or the sensitive internal parts when joined glass parts are separated. The use of low temperature sealing compositions to seal the tubes furnishes a basis for the method of separation disclosed herein.

It is known that heating a sealed large glass article such as a television tube with atmospheric pressure both within and without the tube, results in substantial glass breakage. The origins of the breakage are observed on the internal surfaces of the seal either in the sealing layer or between the sealing composition and one of the joined parts. In order to reduce this breakage a physical load is placed on the sealed edges in the form of an internal vacuum. The vacuum applies a load to place the inside surface of the tube seal in compression to counteract the tension developed on the inner surface during the heating operation. Only by more evenly balancing the stresses between the inner and outer surfaces of the seal is the tube able to be separated without substantial glass breakage.

The principal object of this invention is to provide a method for the separation or disassembly of hollow glass articles which have been assembled from a plurality of prefabricated glass parts joined by low melting seals, for example, low temperature sealing compositions, whereby the separation can be made at temperatures below which deformation of the glass parts or damage to the working parts will occur to preserve whole and without damage both the internal and external elements of the composite glass articles.

Another object of this invention is to provide a method for the separation of hollow glass articles joined at their sealing edges or joined to metal parts by low-temperature sealing compositions to separate glass-to-glass or glass-to-metal seals without damage to either the glass or metal parts.

Another object of this invention is to provide a method for the separation of hollow glass articles at their sealing edges without distortion of said edges or of the glass parts, leaving portions of the bonding material on both disjointed surfaces to permit subsequent reassembly of the separated parts by the residual bonding material and successive reopening and resealing of the glass articles as required.

Another object of this invention is to provide a method the separation of hollow glass articles at temperatures
w which deformation or permanent thermal stresses
established in the glass parts.

nother object of this invention is to provide a method
the separation of hollow glass articles to permit in-
s into the internal working areas of the glass articles
acilitate substitution or replacement of defective mem-
; of the completed glass articles by an exchange of
rchangeable mating parts.

nother object of this invention is to provide a method
the separation of hollow glass articles to make pos-
e economical servicing of sensitive internal working
ts he specific nature of this invention, as well as other
ects and advantages thereof, will become apparent
those skilled in the art from the following detailed
cription taken in conjunction with the annexed sheet
drawings, on which by way of preferred example
y, is illustrated one embodiment of this invention:

Referring to the accompanying drawings:

Fig. 1 is a vertical sectional view illustrating one appli-
ion of this invention.

The illustrated application of this invention pertains
a method for the separation of a cathode ray tube
h as used in the reception of color television pic-
es. In the fabrication of such a tube it is essential
t the temperatures used to seal the prefabricated hard
ss parts be controlled at a level below which the
ernal elements of the tube are damaged. The shadow
sk may be distorted or the phosphors may be damaged
temperatures in excess of 824° F. (450° C.). Also,
; annealing characteristics of the glass parts limit the
ling temperatures of the tube.

By the use of a suitable bonding composition glass
rts of the tube are sealed and unsealed at their edges
a temperature level below the temperature limitations
the component parts. The low temperature sealing
mpositions described in the referred to patent applica-
n, are able to bond the glass parts of the tube with-
t exceeding the temperature limitations of the more
nsitive tube elements and without creating stresses or
formation in the joined glass parts. The edges of
e glass parts which are sealed together, must be flat
have opposing surfaces of mating contour. In the
aling operation at least one of the edges of the glass
irts is coated with one of the sealing compositions and
aced in sealing alignment. The aligned parts are sub-
cted to a temperature level below which permanent
resses are imparted to the glass parts, but sufficient to
elt the sealing composition to join the said composi-
on to the glass parts where applied and thereby unite
e glass parts when the same are moved into contact-
g alignment. The details of various methods of join-
g glass parts are clearly set forth in the aforementioned
pplication.

The low temperature sealing compositions differ in
omposition from the joined glass parts which may be
ommercial soda-lime silica glass or other glasses of
milar characteristics. The constituents of the sealing
ompositions which are most effective in providing bond-
g materials of low fusion temperatures are the oxides
of lead, boron and other metal oxides. The quantities
of these oxides which are utilized in compounding the
sealing compositions are limited by the desired coefficient
of thermal contraction in the resulting glass composi-
tions. Compositions which consist essentially of lead
oxide (PbO), boric oxide ($B_2O_3$) and copper oxide
(CuO), in which lead oxide (PbO) is the major con-
stituent, have satisfactory contraction coefficients for join-
ing prefabricated hard glass parts. These compositions
also have satisfactory properties of chemical durability
and resistance to devitrification.

The properties of the sealing compositions are by
necessity a function of and related to the properties of
the glass making up the prefabricated hard glass parts.
Control of the contraction coefficients of the sealing glass
compositions to be within agreeable working limits with
the properties of the glass parts is of major importance
in sealing and unsealing the glass parts and is obtained
by controlling the composition of the sealing glass. The
fiber softening point of the sealing compositions should
not be higher than the strain point of the glass parts
and should preferably reside within a temperature range
of from 600° to 800° F. With an overlap of physical
properties of the brazing composition and the parent hard
glass parts the brazing glass will permit the functions
of sealing and opening the glass article with a minimum
disturbance of its shape or stress pattern.

The constituents of the sealing compositions which
are disclosed in Tables I and II of the referred to pat-
ent application, consist primarily of lead oxide (PbO)
and boric oxide ($B_2O_3$) with additions of relatively small
amounts of one or more of the oxides of zinc, copper,
silver, antimony, cadmium, and other metal oxides.

Typical compositions are shown below in Table I. The
preferable sealing composition is composition "A" con-
sisting of lead oxide, boric oxide, zinc oxide, and copper
oxide having a fiber softening point within the tem-
perature range from 758° to 772° F. and a coefficient
of thermal contraction from 250° C. to room temperature
of 88 to $92 \times 10^{-7}$ per ° C. Other minor minor constitu-
ents not listed include the common glass components of
fluorine and alkali oxides.

Table I

|  | A | B | C | D | E | F | G | H | I | J |
|---|---|---|---|---|---|---|---|---|---|---|
| PbO | 71 | 71 | 71 | 71 | 72 | 71 | 70 | 68.4 | 71.4 | 70 |
| $B_2O_3$ | 17 | 17 | 17 | 17 | 19 | 20 | 15 | 18.6 | 19.6 | 14 |
| ZnO | 9 | 9 | 9 | 9 | 9 |  | 9 |  |  |  |
| CdO |  |  | 1.5 | 3 |  |  | 6 |  |  |  |
| CuO | 3 |  |  |  |  | 9 |  |  |  |  |
| $Ag_2O$ |  | 3 | 1.5 |  |  |  |  | 13 | 9 | 16 |
| ZnO+CuO |  |  |  |  |  |  |  |  |  |  |
| Other minor constituents |  |  |  |  | 1 |  |  |  |  |  |
| F. S. P. ° F | 765 | 738 | 752 | 769 | 801 | 792 | 756 | 794 | 795 | 735 |
| $\alpha \times 10^{-7}$ | 90.0 |  |  |  | 90.6 | 89.6 |  | 88.3 | 90.0 | 90.0 (250° C–0° C) |

The low temperature sealing compositions lie within
the ranges disclosed in Table II. Other constituents may
be substituted to replace either the zinc or copper oxides
of the preferable composition "A."

Table II

| | | |
|---|---|---|
| PbO | percent | 67–73 |
| $B_2O_3$ | do | 14–21 |
| ZnO | do | 0–11 |
| CdO | do | 0–10 |
| CuO | do | 0–10 |
| $Ag_2O$ | do | 0–5 |
| $ZnO+CuO+CdO+Ag_2O$ | do | 9–18 |
| F. S. P | ° F | 600–850 |

The method of separation or disassembly of shaped
glass parts disclosed herein may be employed when the
parts are joined by the above compositions or by other
similar compositions to form glass-to-glass or glass-to-
metal seals. The following description relates to an elementary form of apparatus to effect the separation of a cathode ray tube, the glass parts of which are joined by a low melting composition.

Referring to the drawings, a heating chamber or oven designated by reference numeral 10 is provided for heating the glass article or tube 26 to be separated. The oven 10 is a square or rectangular-shaped box which is constructed of heat-resistant material suitably mounted on legs 11 to furnish access into its interior through both its top and bottom portions. The oven 10 may have either a removable top or bottom for convenient introduction of the article into its interior heating space. The oven bottom 12, which is shown removable, is attached by a sliding collar 13 to a vertical shaft 14 which is an integral part of one leg 11. The collar 13 is located externally near one side of the oven bottom 12 to permit vertical and horizontal travel for swinging the said bottom 12 to one side when the glass article is placed in or removed from the oven 10. The bottom 12 is held fixed in the opened or closed position by a set screw 15 in the side of the vertically sliding collar 13 which contacts the vertical shaft 14 and tightens thereon. The bottom 12 is provided with an internal cup-shaped member 16 attached to its inner surface by a vertical shaft 17 which slides vertically through a collar 18 in the center of said bottom 12 and which can be held in position by a set screw 19 in the side of the said collar 18.

The oven 10 has a hole 20 in its top surface to allow a portion of the tube 26 to be separated to protrude therefrom. The hole 20 is internally surrounded by a rigid flange 21 which is used to support an internal mating flange 22 constructed of a resilient heat-resistant material. Above and in line with the hole 20 is disposed a supporting member or fork 23 on the external top surface of the oven 10 for holding the protruding portion of a glass tube 27. Thus, the article can be held in a fixed position within the oven contacting the flange 22, its weight supported by the external fork 23.

The oven 10 is preferably heated by an electrical resistance-type heating element 24 which forms a continuous ring within the oven 10 in its medial section. The heating element 24 is located in a horizontal position around the external periphery of the article to be separated a uniform distance apart therefrom. The oven 10 may also be heated by a circular row of gas burners similarly extending around the oven interior.

The fabricated glass article consists of a cathode ray tube 26 disposed within the oven cavity with its neck 27 in the upright or vertical position extending through the upper oven hole 20. The upper extremity of a tube neck 27 is held by the external supporting fork 23 at a point below the tube cap 39. The two major portions of the glass tube 26, the funnel 28 and face plate 29 which are joined by one of the sealing compositions at the junction of their edges by a seal 30, are located within the center section of the oven 10 opposite the annular heating element 24.

A device 31 which is used to draw a vacuum on the tube 26 having no vacuum therein, consists of a metallic bushing 32, having a small beveled hole therein through which is inserted a small beveled metallic plunger 33, which device is placed around and against the tube neck 27 and clamped thereto. The small plunger 33 passes freely through a hole in the bushing 32 to contact the external side wall of the tube neck 27 and is used to puncture the glass of the tube neck 27. The plunger 33 is connected by a suitable length of tubing or pipe line to a T connection, the other two sides of which lead to a vacuum line 34 and a gas pressure line 35, each of which have mounted therein a regulatory valve 36 and 37 respectively.

The tube 26 is positioned in the oven 10 with its funnel portion drawn up tight against the cylindrical vertical flange 22 constructed of heat-resistant material such as a silicone rubber to prevent the loss of heat through the upper oven hole 20 and to lessen the flow of heat to the external portion of the tube neck 27. With the tube 26 properly held within the over 10, electrical power is applied to the heating element 24 to uniformly heat the tube at the annular seal 30 where the funnel 28 and face plate 29 are joined. The tube 26 is heated at a controlled rate which will not create detrimental stresses in the glass parts to a temperature near the softening point of the sealing composition. The temperature necessary to soften the composition will be in the temperature range of from 600° F. to a temperature not in excess of 850° F., depending upon the melting temperature of the composition. The heat is directed to the external surface of the annular seal 30 by the tube being positioned with the seal located opposite the heating element 24. The heat is then concentrated on the seal 30 as much as possible.

The tube 26 must be heated with an internal vacuum therein. The tube may be heated having the internal vacuum sealed therein when the tube was manufactured or if the tube has lost its vacuum, one must be drawn on the tube interior. A vacuum can be created by puncturing the tube neck 27 with the plunger 33 which has been independently heated by pushing the hot plunger into the side wall of the tube neck 27 through the hole in the bushing 31. The plunger 33 and the bushing 32 are made to fit together tightly to maintain a tight seal between the plunger 33, the bushing 32, and the tube neck 27 to hold the vacuum. The valve 36 is opened to draw a vacuum on the tube 26. The vacuum is held within the tube during the entire time of heating until a temperature level is reached just below the temperature where the sealing composition softens.

In the case of a completed tube sealed with a vacuum therein, the vacuum tube 26 is heated to a temperature just below the temperature where the sealing composition softens. Then the tube neck 27 is punctured to relieve the vacuum and to introduce gas pressure into the interior to effect the actual separation of the joined parts at the seal 30.

To separate the parts the valve 36, in the vacuum line 34 which is open when a vacuum is being drawn on the tube 26, is closed and the valve 37 in the gas pressure line 35 is opened to admit a positive gas pressure into the tube interior. The gas which is used to separate the parts is preferably a protective or non-reactive gas such as carbon dioxide to avoid oxidation of the internal tube elements which having been elevated in temperature, are more readily oxidizable. Other gases such as helium, nitrogen, or argon may be used depending on the nature of the internal parts to be protected. The gas pressure within the tube is increased to approximately one-half to one pound per square inch above atmospheric pressure to effect the separation of the parts at the annular seal 30. The pressure required is small because the glass composition has softened, the heavy face plate 29 is held only by the softened material and the pressure is applied to a sizable area. The face plate 29 will, due to its own weight, gradually move down onto the cup-shaped member 16 as shown by dotted line 38. The member 16 has been previously adjusted to a position slightly below the face plate before the positive gas pressure is applied. Heating is continued while the separated edges are held apart approximately parallel in a near position so that the strings of sealing composition which appear between the separated edges may soften and retract to the upper and lower disjoined edge surfaces. The composition softens uniformly and will inherently retract to the edge surfaces of the separated parts with no loss of sealing composition to permit subsequent resealing of the parts without any further additions of said composition. The face plate 29 and the funnel 26 are cooled after separation at a controlled rate such that excessive breakage is not experienced.

Alternately for using the punching device 31 on the tube neck 27 is a glass exhaust tubulation is used, it can be pinched off prior to the start of heating and a flexible tube attached thereto through which the vacuum can be drawn. The gas pressure for the separation would then be introduced through the exhaust tubulation. The tubulation could also be used if the tube is previously evacuated to apply internal gas pressure after the tube is heated to separate the parts.

This method may also be used to separate a glass-to-metal seal which has been fabricated using a low temperature sealing composition. For example, the cathode ray tube 26 may have a metallic cap or closure 39 joined to the glass tubulation by one of the low temperature sealing compositions, closing the tube end at the seal 40. By reversing the position of the tube 26 and locating the glass-to-metal seal 40 in a position where the seal can be properly heated in a localized area at a controlled rate, the sealing composition can be heated and softened. By heating the glass-to-metal seal at a controlled rate so that detrimental stresses are not created in the glass parts to a temperature not in excess of 850° F., a similar separation of the glass and metal parts may be effected when the sealing composition is softened.

The foregoing procedure is also used to separate the glass-to-metal joint. The tube is heated with an internal vacuum until the sealing composition is softened when the internal pressure is increased to one-half to one pound per square inch to separate the parts. The separated parts are held slightly apart until the strings of sealing composition melt down and retract to the separated edges. The glass and metal parts are cooled at a controlled rate to prevent breakage thereof.

The use of the term "hard" glass in the foregoing description and claims refers to the glass in its rigid condition and not to its composition.

The term "protective or non-reactive" gas is intended to means such gases which will prevent damage to the internal elements within the glass article.

It will, of course, be understood that various details of this method may be modified through a wide range without departing from the principles of this invention, and it is therefore, not the purpose to limit the patent granted hereon otherwise than necessitated by the scope of the appended claims.

We claim:

1. The method of separating a hollow glass article formed from a plurality of shaped hard glass parts joined by a low temperature sealing composition, which method comprises the steps of providing an opening into the interior to thereby evacuate the same, subjecting the sealed joint to sufficient heat to soften the said sealing composition at a temperature of about 850° F., and increasing the pressure within said article from sub-atmospheric to a super-atmospheric pressure to separate the joined parts and cooling the separated parts at a controlled rate.

2. The method of separating a hollow glass article formed from a plurality of shaped glass parts hermetically joined by a low temperature sealing composition, which method comprises the steps of providing an opening into the interior to thereby evacuate the same, subjecting the sealed joint to sufficient heat not in excess of 850° F. to soften the said sealing composition, increasing the internal pressure within said article from sub-atmospheric to a super-atmospheric pressure to separate the joined parts a short distance apart leaving portions of the said sealing composition on the disjoined surfaces and cooling the separated parts at a controlled rate.

3. The method of separating a hollow glass article formed from a plurality of shaped glass parts hermetically joined by a low temperature sealing composition, which method comprises the steps of providing an opening into the said interior to thereby evacuate the same, heating the sealed joint at a controlled rate to a temperature not in excess of 850° F. sufficient to soften the said sealing composition, increasing the internal pressure from sub-atmospheric to slightly greater than atmospheric pressure by the use of a non-reactive gas to controllably separate the joined parts, maintaining the said parts slightly separated to permit the sealing composition to uniformly separate and retract to each of the disjoined surfaces and controlling the rate of cooling of the parts.

4. The method of separating a sealed hollow glass article having internal working elements, which article is formed from a plurality of shaped glass parts joined by a low temperature sealing composition, which method comprises providing an opening into the interior thereof to evacuate the same to near vacuum, heating the sealed joint at a controlled rate to a temperature not in excess of 850° F. to soften the said sealing composition, adding a non-reactive gas internally of said article and at a pressure slightly above atmospheric to separate the sealed joint, maintaining the glass parts slightly separated to allow the cohesive portions of the said sealing composition to further soften and retract to the edge surfaces of the separated parts, and cooling the parts at a controlled rate to avoid breakage thereof.

5. The method of separating a sealed hollow glass article having internal working elements, which article is formed from a plurality of shaped hard glass parts and metal parts joined by a low temperature sealing composition, which method comprises providing an opening into the interior thereof to evacuate the same to near vacuum, heating the sealed joint at a controlled rate to a temperature not in excess of 850° F. to soften the said sealing composition, adding a non-reactive gas internally of said article and at a pressure not in excess of one pound per square inch above atmospheric pressure to separate the sealed joint, maintaining the glass parts slightly separated to allow the cohesive portions of sealing material to soften and retract to the edge surfaces of the separated parts, and cooling the parts at a controlled rate to avoid breakage thereof.

6. The method of separating a sealed hollow glass article having internal working elements, which article is formed from a plurality of shaped glass parts joined by a low temperature sealing composition, which method comprises providing an opening into the interior thereof to evacuate the same to near vacuum, heating the sealed joint at a controlled rate to a temperature not in excess of 850° F. to soften the said sealing composition, adding a protective gas to avoid oxidation of the said internal elements at a pressure not in excess of one pound per square inch above atmospheric pressure to separate the sealed joint, holding the separated parts slightly apart to allow the softened sealing composition to further soften and retract to the separated edge surfaces thereof, and cooling the parts at a controlled rate to avoid breakage thereof.

7. The method of separating a hermetically sealed hollow article formed from a plurality of shaped glass and metal parts, the metal parts being hermetically joined to the glass parts by a low temperature sealing composition, which method comprises the steps of providing an opening into the interior of the article to thereby maintain the same evacuated, subjecting the sealed areas to a temperature not in excess of 850° F. sufficient to soften the said sealing composition, changing the pressure within said article from sub-atmospheric to super-atmospheric to cause separation of the joined parts, continuing the heating of the composition to fully separate the composition into annular bands on both the disjoined parts and cooling the fully separated parts and cooling the separated parts at a controlled rate.

8. The method of separating a hermetically sealed hollow article formed from a plurality of shaped glass and metal parts joined by a low temperature sealing composition, which method comprises the steps of providing an opening into the said interior to thereby evacuate the same, heating the sealed joint at a controlled rate to a temperature not in excess of 850° F. sufficient to attain softening of the sealing composition, gradually increasing the internal pressure to slightly greater than atmospheric pressure to controllably separate the joined parts a prescribed distance apart, maintaining the said parts slightly separated and in alignment to permit the softened sealing composition to uniformly separate and retract to each of the disjoined edge surfaces, and controlling the rate of cooling of the parts.

9. The method of separating a sealed hollow article formed from a plurality of shaped hard glass parts and metal parts joined by a low temperature sealing composition, which method comprises providing an opening into the interior of said article to evacuate the same to near vacuum, increasing the temperature of the sealed joint at a controlled rate to a temperature not in excess of 850° F. to soften the said sealing composition, adding carbon dioxide at a pressure not in excess of one pound per square inch above atmospheric pressure to separate the sealed joint, maintaining the separated parts a slight distance apart to allow the cohesive portions of the softened sealing material to retract to the separated edge surfaces, and cooling the parts to avoid breakage thereof.

References Cited in the file of this patent

UNITED STATES PATENTS

| 961,375 | Seabrook | June 14, 1910 |
| 1,883,662 | Fisher | Oct. 18, 1932 |